US012583134B2

(12) United States Patent
     Kim et al.

(10) Patent No.:     US 12,583,134 B2
(45) Date of Patent:        Mar. 24, 2026

(54) NECK DEVICE FOR ABSORBING SHOCK AND REDUCING VIBRATION OF LEGGED MOBILE ROBOT

(71) Applicant: Seoul National University R&DB Foundation, Seoul (KR)

(72) Inventors: Taekyun Kim, Seoul (KR); Dongjun Lee, Seoul (KR)

(73) Assignee: Seoul National University R&DB Foundation, Seoul (KR)

( * ) Notice:   Subject to any disclaimer, the term of this patent is extended or adjusted under 35 U.S.C. 154(b) by 426 days.

(21) Appl. No.: 18/296,312

(22) Filed:      Apr. 5, 2023

(65)            Prior Publication Data

US 2024/0165834 A1      May 23, 2024

(30)         Foreign Application Priority Data

Nov. 18, 2022    (KR) ......................... 10-2022-0155514

(51) Int. Cl.
     *B25J 19/00*       (2006.01)
     *B25J 19/02*       (2006.01)
     *B62D 57/032*      (2006.01)
     *F16F 15/02*       (2006.01)
(52) U.S. Cl.
     CPC ......... *B25J 19/0091* (2013.01); *B25J 19/023* (2013.01); *B62D 57/032* (2013.01); *F16F 15/022* (2013.01)
(58) Field of Classification Search
     CPC ...... B25J 19/0091; B25J 19/023; B25J 19/00; B25J 9/0009; B25J 19/02; B62D 57/032; B62D 57/02; F16F 15/022
     See application file for complete search history.

(56)                References Cited

U.S. PATENT DOCUMENTS

2013/0264455 A1*  10/2013  Robbins ................ B60N 2/501
                                              296/190.07

FOREIGN PATENT DOCUMENTS

CN        105736625 A   *   7/2016   ............ F16F 15/022
CN        119223087 A   *  12/2024   ............ F16F 15/067
HU         231331 B1  *  12/2022   ............ B23Q 11/00
                      (Continued)

OTHER PUBLICATIONS

JP 4679527 Machine English Translation, ip.com (Year: 2011).*
Lui et al. CN 105736625 Machine English translation, ip.com (Year: 2018).*

*Primary Examiner* — Karen Beck
(74) *Attorney, Agent, or Firm* — Knobbe, Martens, Olson & Bear, LLP

(57)                ABSTRACT

Proposed is a neck device for absorbing shock and reducing vibration of a legged mobile robot. The device may include a shock absorber, a sensor platform coupled to a part of the shock absorber, and a variable dynamic vibration absorber mounted on the sensor platform. The shock absorber may be fixed to a body portion of the legged mobile robot and configured to absorb shock and vibration. The sensor platform may include a camera and an inertial measurement unit. The variable dynamic vibration absorber may be configured to adjust an absorption frequency of shock and vibration caused by a movement of the legged mobile robot. The shock absorber and the variable dynamic vibration absorber may reduce shock and vibration transmitted to the sensor platform, so as to reduce movement and rotation of the sensor platform.

4 Claims, 4 Drawing Sheets

(56)        References Cited

FOREIGN PATENT DOCUMENTS

| JP | 4679527 B2 * | 4/2011 | |
|---|---|---|---|
| KR | 101477068 B1 * | 12/2014 | ........... B62D 57/032 |
| KR | 10-1803742 B1 | 12/2017 | |
| KR | 101876640 B1 * | 7/2018 | .............. B25J 9/144 |
| NL | 1031263 C2 * | 9/2007 | ................ B66F 7/20 |
| WO | WO-2023149355 A1 * | 8/2023 | ............ B25J 9/1689 |

* cited by examiner

NECK DEVICE FOR ABSORBING SHOCK AND REDUCING VIBRATION OF LEGGED MOBILE ROBOT

CROSS REFERENCE TO RELATED APPLICATION

The present application claims priority to Korean Patent Application No. 10-2022-0155514, filed Nov. 18, 2022, the entire contents of which are incorporated herein for all purposes by this reference.

BACKGROUND

Technical Field

The present disclosure relates to a neck device for absorbing shock and reducing vibration of a legged mobile robot. More particularly, the present disclosure relates to a neck device for absorbing shock and reducing vibration of a legged mobile robot, the neck device being configured to obtain stable visual sensor data and stable inertial sensor data by absorbing shock and vibration that are generated during walking of the legged mobile robot.

Description of the Related Technology

Generally, a dynamic vibration absorber is a classical means commonly used in the field of vibration control, and the dynamic vibration absorber is configured to suppress vibration of a structure by tuning a natural frequency of the dynamic vibration absorber to a natural frequency of the structure.

SUMMARY

One aspect is a neck device for absorbing shock and reducing vibration of a legged mobile robot, the neck device being capable of absorbing shock and reducing vibration and, at the same time, being capable of stabilizing a movement of a sensor platform according to walking pattern of the legged mobile robot.

Another aspect is a neck device for absorbing shock and reducing vibration of a legged mobile robot, the neck device including: a shock absorber fixed to a body portion of the legged mobile robot in which a plurality of leg portions is supporting the body portion, the shock absorber being configured to absorb shock and vibration; a sensor platform coupled to a part of the shock absorber, the sensor platform including a camera and an inertial measurement unit; and a variable dynamic vibration absorber mounted on the sensor platform, the variable dynamic vibration absorber being configured to adjust an absorption frequency of shock and vibration caused by a movement of the legged mobile robot. Furthermore, the shock absorber and the variable dynamic vibration absorber are reducing shock and vibration that are transmitted to the sensor platform, thereby reducing movement and rotation of the sensor platform.

The shock absorber may include: a fixed plate fixed to the body portion of the legged mobile robot; and a plurality of linkages connected to a plurality of joints with a plurality of connection rods such that first side portions of the plurality of linkages are fixed to the fixed plate and second side portions of the plurality of linkages are fixed to the sensor platform.

The plurality of linkages may further include a hydraulic damper and a spring.

The variable dynamic vibration absorber may include: an actuator coupled to the sensor platform; a torsion spring configured to be rotated by an operation of the actuator; a guide connected to the torsion spring and configured to be rotated; and a linear stepping motor configured to be moved along the guide.

The variable dynamic vibration absorber may be configured to rotate the torsion spring so that the guide and the linear stepping motor are horizontal as the linear stepping motor moves along the guide.

The neck device for absorbing shock and reducing vibration of the legged mobile robot according to the present disclosure has effects as follows.

First, since shock and vibration that are generating during the walking of the legged mobile robot are excellently absorbed, stable visual information and stable inertial information are capable of being obtained.

Second, since low-cost members compared to high-cost vibration-absorbing members are used, manufacturing cost of the legged mobile robot is significantly reduced, so that the present disclosure is economical.

BRIEF DESCRIPTION OF THE DRAWINGS

The above and other objectives, features, and other advantages of the present disclosure will be more clearly understood from the following detailed description when taken in conjunction with the accompanying drawings.

DETAILED DESCRIPTION

Figure 1:
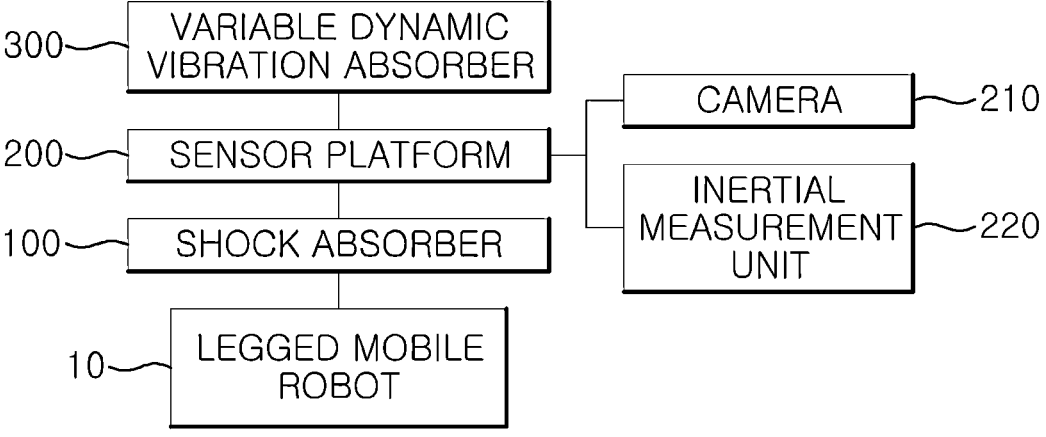
FIG. 1 is a schematic view illustrating a configuration of a neck device for absorbing shock and reducing vibration of a legged mobile robot according to an embodiment of the present disclosure.

Currently, the most widely used dynamic vibration absorber is designed in the most basic type in which mass is added to a cantilever.

In Korean Patent No. 10-1803742, a dynamic vibration absorber using a constraint condition of an ellipse and a variable length-type cantilever system is proposed.

In the conventional technology, in the dynamic vibration absorber designed in the form of adding mass to a cantilever, a natural frequency can be varied by using a constraint condition of a cantilever and an elliptic equation.

In a frequency adjustment of the conventional dynamic vibration absorber, the range of the constraint condition of the cantilever using the elliptic equation is limited, and the change in the natural frequency due to the change in the mass body or the change in the position of the mass body is large, so that there is a problem that inconvenience occurs since the conventional dynamic vibration absorber is not easy to be adjusted in the field. Therefore, there is a problem in that effective vibration control is difficult.

Meanwhile, with the development of a legged mobile robot, research and development of the legged mobile robot are in progress recently. The legged mobile robot is provided with various sensors, so that utilization of the legged mobile robot is increasing.

For example, a visual and inertial information-based position estimation method using a camera sensor and an inertial measurement unit in the robot is widely used for a position estimation system of the robot due to complementary characteristics of each information, low price, and light weight.

In the legged mobile robot, a periodical shock between legs and the ground and a vertical movement are accompanied during walking of the legged mobile robot. At this time, generated shock and generated vibration interfere with the acquisition of information from sensors (the camera sensor and the inertial measurement unit) attached to the legged mobile robot, so that the position estimation system using the sensors becomes unstable.

In a drone, in order to solve a similar vibration problem, a sensor platform coupled to a rubber damper, a nylon ring, and so on is used. In this method, since the sensor platform cannot be adjusted after the sensor platform is installed, the sensor platform may resonate according to walking pattern of the legged mobile robot. In addition, the lower the stiffness of the damper is, the more advantageous the damper is to absorb vibration, but the damper may be excessively deformed when the damper receives shock or when the damper is moved dynamically. When the sensor platform is moved rapidly, a motion blur may occur in the camera sensor, and the motion blur is a problem in a feature point extraction and a tracking method that are used for the position estimation.

The embodiments described below are provided so that those having ordinary skill in the art can easily understand the technical idea of the present disclosure, and thus the present disclosure is not limited thereto. In addition, the items represented in the attached drawings are the schematized drawings in order for easily describing the embodiments of the present disclosure and may be different from the forms actually implemented.

When any constituent element is referred to as being connected or contacted with other constituent elements, it should be understood that it may be directly connected or contacted with the other constituent elements but there may be the other constituent elements therebetween.

Figure 2:
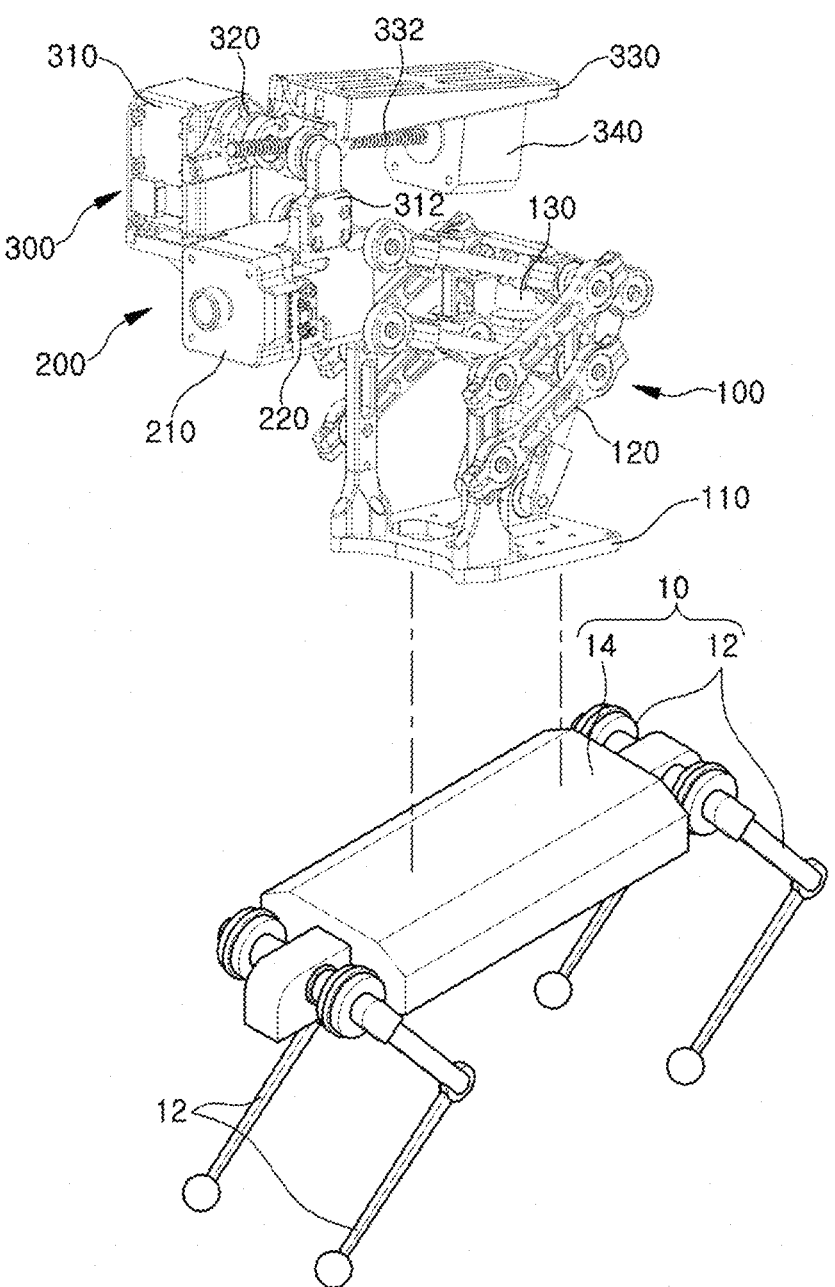
FIG. 2 is a schematic view illustrating the neck device for absorbing shock and reducing vibration of the legged mobile robot according to an embodiment of the present disclosure.
Figure 3:
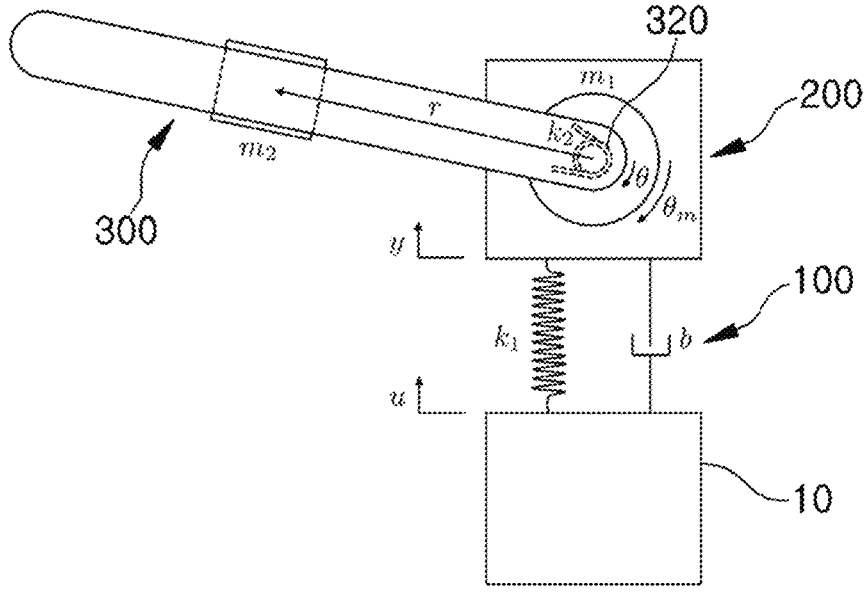
FIG. 3 is a schematic view illustrating an entire configuration of the neck device for absorbing shock and reducing vibration of the legged mobile robot according to an embodiment of the present disclosure.
Figure 4:
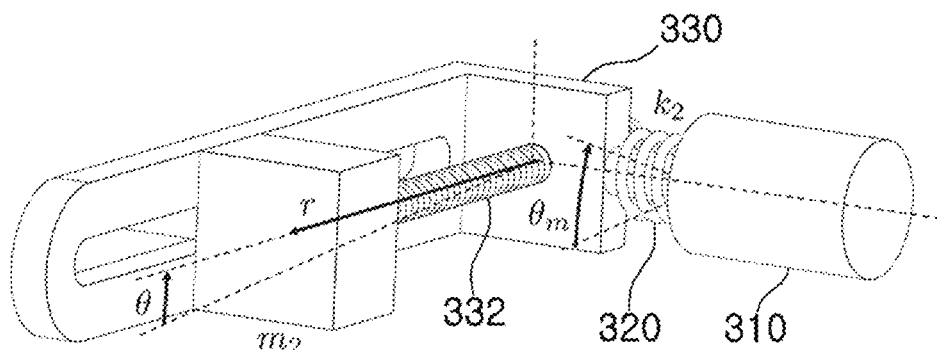
FIG. 4 is a schematic view illustrating a variable dynamic vibration absorber of the neck device for absorbing shock and reducing vibration of the legged mobile robot according to an embodiment of the present disclosure.

FIG. 1 is a schematic view illustrating a configuration of a neck device for absorbing shock and reducing vibration of a legged mobile robot according to an embodiment of the present disclosure, FIG. 2 is a schematic view illustrating the neck device for absorbing shock and reducing vibration of the legged mobile robot according to an embodiment of the present disclosure, FIG. 3 is a schematic view illustrating an entire configuration of the neck device for absorbing shock and reducing vibration of the legged mobile robot according to an embodiment of the present disclosure, and FIG. 4 is a schematic view illustrating a variable dynamic vibration absorber of the neck device for absorbing shock and reducing vibration of the legged mobile robot according to an embodiment of the present disclosure.

Referring to FIGS. 1 to 4, a neck device for absorbing shock and reducing vibration of a legged mobile robot according to an embodiment of the present disclosure includes a shock absorber 100, a sensor platform 200, and a variable dynamic vibration absorber 300.

According to the present disclosure, the shock absorber 100 is fixed to a body portion 14 of a legged mobile robot 10 in which a plurality of leg portions 12 is configured to support and move the body portion 14, and the shock absorber 100 absorbs shock and vibration. The leg portion 12 of the legged mobile robot 10 includes a joint motor and a support bar, and supports the body portion 14 at a lower side portion of each corner of the body portion 14 such that the body portion 14 is capable of being moved.

The shock absorber 100 includes a fixed plate 110 and a plurality of linkages 120.

The fixed plate 110 has a plate shape, and is fixed to the body portion 14 of the legged mobile robot 10. The fixed plate 110 may be coupled to an upper end of an end portion side with respect to a longitudinal direction of the body portion 14.

The plurality of linkages 120 is coupled to a plurality of joints with connection rods such that first side portions of the plurality of linkages 120 are fixed to the fixed plate 110 and second side portions of the plurality of linkages 120 are fixed to the sensor platform 200.

The plurality of linkages 120 may further include hydraulic dampers and springs 130 that are absorbing shock and vibration according to a movement of the legged mobile robot 10.

The sensor platform 200 is coupled to a part of the shock absorber 100, and includes a camera 210 and an inertial measurement unit 220.

The camera 210 acquires visual information such as image information or video information, and the inertial measurement unit 220 acquires position information as the legged mobile robot 10 moves.

The sensor platform 200 may be connected to the plurality of linkages 120, and the camera 210 and the inertial measurement unit 220 are positioned toward a front side. A position where the camera 210 is positioned is the front side, and an opposite direction is a rear side.

The variable dynamic vibration absorber 300 is mounted on the sensor platform 200, and is configured to adjust an absorption frequency of shock and vibration according to the movement of the legged mobile robot 10.

The variable dynamic vibration absorber 300 includes an actuator 310, a torsion spring 320, a guide 330, and a linear stepping motor 340.

The actuator 310 is coupled to an upper side portion of the sensor platform 200 by a coupling member 312.

The torsion spring 320 is coupled to a rotational shaft of the actuator 310, and is rotated by an operation of the actuator 310. Furthermore, a first end of the torsion spring 320 receives a force by the actuator 310, and a second end of the torsion spring 320 applies the force to the guide 330. While the legged mobile robot 10 is operated, a movement of the guide 330 is controlled only by an elasticity of the torsion spring 320.

The guide 330 is rotatably connected to the coupling member 312 to which the torsion spring having a part thereof rotated by the actuator 310 and the actuator 310 are fixed. In addition, the guide 330, the camera 210, and the linear stepping motor 340 may be positioned on the same axis with respect to a plane.

The guide 330 is connected to the torsion spring 320, and is configured to be rotated. That is, the first end of the torsion spring 320 receives a force by the actuator according to a rotation direction of the actuator 310, so that the guide 330 is rotated by the second end of the torsion spring 320.

The linear stepping motor 340 is configured to move along the guide 330. As the linear stepping motor 340 is rotated, the linear stepping motor 340 is moved along a guide rod 332 of the guide 330.

A mass pendulum for controlling a load may be additionally mounted on the linear stepping motor 340 so that a load is capable of controlled.

As the linear stepping motor 340 is moved along the guide 330, the variable dynamic vibration absorber 300 is configured to rotate the torsion spring 320 so that the guide 330 and the linear stepping motor 340 are horizontal.

Accordingly, the variable dynamic vibration absorber of the neck device for absorbing shock and reducing vibration of the legged mobile robot according to an embodiment of the present disclosure is configured to reduce shock and vibration that are transmitted to the sensor platform 200 by the legged mobile robot 10, thereby reducing the movement and the rotation of the sensor platform 200.

The neck device for absorbing shock and reducing vibration of the legged mobile robot according to an embodiment of the present disclosure may further include a control unit that includes a microprocessor configured to perform an operation processing so as to control an overall operation, and may further include a power supply configured to supply a power.

In describing an operational relationship of the neck device for absorbing shock and reducing vibration of the legged mobile robot according to an embodiment of the present disclosure with reference to FIGS. 1 to 4 together, when the legged mobile robot 10 is moved, shock and vibration are transmitted to the shock absorber 100. Then, the shock and the vibration transmitted to the shock absorber 100 are transmitted to the sensor platform 200 and the variable dynamic vibration absorber 300. The shock absorber 100 and the variable dynamic vibration absorber 300 absorb the applied shock and the applied vibration.

The variable dynamic vibration absorber 300 is mounted on the sensor platform 200, and is configured to adjust an absorption frequency of shock and vibration according to the movement of the legged mobile robot 10.

With the assumption that mass of the guide 330 of the variable dynamic vibration absorber 300 is sufficiently light compared to other masses and the mass of the guide 330 can be assumed to be zero and can be ignored, a potential energy V and a kinetic energy t of the entire neck device for absorbing shock and reducing vibration of the legged mobile robot can be expressed by expression 1 and expression 2 as follows.

$$V = (m_1 + m_2)gy + m_2 rg\sin(\theta) + \frac{1}{2}k_1(y-u)^2 + \frac{1}{2}k_2(\theta - \theta_m) \quad \text{Expression 1}$$

$$T = \frac{1}{2}(m_1 + m_2)\dot{y}^2 + m_2 r\cos\theta \dot{y}\dot{\theta} + \frac{1}{2}m_2 r^2\dot{\theta}^2 \quad \text{Expression 2}$$

(Where u is a height of the legged mobile robot, y is a height of the sensor platform, $m_1$ is the mass of the sensor platform, $m_2$ is the mass of the mass body of the variable dynamic vibration absorber, $k_1$ is the spring stiffness of the shock absorber, $k_2$ is the spring stiffness of the torsion spring of the variable dynamic vibration absorber, b is the damping constant of the shock absorber, r is the distance from the center of the torsion spring of the variable dynamic vibration absorber to the center of gravity of the mass body, $\theta$ is the guide rotation angle of the variable dynamic vibration absorber, and $\theta_m$ is the actuator rotation angle of the variable dynamic vibration absorber.)

Here, a dynamical system equation of the entire device of equation 3 and equation 4 are obtained by the Euler-Langrage equation

6

$$\frac{d}{dt}\left(\frac{\partial}{\partial \dot{q}}L\right) - \frac{\partial}{\partial q}L = \tau_q$$

$$(m_1+m_2)\ddot{y}+m_2r\cos\theta\ddot{\theta}-m_2r\sin\theta\dot{\theta}^2+k_1(y-u)=-b(\dot{y}-\dot{u}) \quad \text{Expression 3:}$$

$$m_2r\cos\theta\ddot{y}+m_2r^2\ddot{\theta}+m_2rg\cos\theta+k_2(\theta-\theta_m)=0 \quad \text{Expression 4:}$$

(Where $q \in \{u, \theta\}$: generalized coordinates, L=T−V: Lagrangian, $\tau$: generalized force)

When $\theta=0$ so that the guide is horizontal in a steady state, the variable dynamic vibration absorber obtains the rotation angle $$\theta m\left(\theta_m = \frac{m_2 rg}{k_2}\right)$$

of the actuator, and linearizes a dynamical system expression of equation 5 and equation 6. It is assumed that the rotation angle of the guide 330 is sufficiently small.

$$(m_1+m_2)\ddot{y}+m_2r\ddot{\theta}+b\dot{y}+k_1y=b\dot{u}+ku \quad \text{Expression 5:}$$

$$m_2r\ddot{y}+m_2r^2\ddot{\theta}+k_2\theta=0 \quad \text{Expression 6:}$$

Next, by using a dynamical system expression of expression 5 and expression 6, a transfer function of a motion output y of the sensor platform for a vertical movement input u of the legged mobile robot of expression 7 is obtained.

$$H(s) = \frac{(m_2 r^2 s^2 + k_2)(bs + k)}{\left((m_1 + m_2)s^2 + bs + k_1\right)(m_2 r^2 s^2 + k_2) - m_2^2 r^2 s^4} \quad \text{Expression 7}$$

An amplitude of the output for an input frequency u is determined by |H(jw)|, and it can be seen that the amplitude of the output is zero at frequency $$w = \sqrt{\frac{k_2}{m_2 r^2}} \cdot$$

That is, when the distance r of the mass body is selected as $$r = \sqrt{\frac{k_2}{m_2 w_t^2}}$$

for a target absorption frequency $\omega_r$, the amplitude of the output becomes zero.

This shows a tendency that the faster the frequency is ($w_t$ ↑), the closer the distance of the mass body (r ↓) should be.

From the analysis of the dynamics, it can be seen that the movement and the shock of the legged mobile robot according to a periodical walking pattern at various speeds can be stabilized by changing the movement of the sensor platform by changing the distance of the mass body according to the frequency.

Therefore, in the neck device for absorbing shock and reducing vibration of the legged mobile robot according to the present disclosure, shock and vibration generated during walking of the legged mobile robot are excellently absorbed, so that stable visual-inertial information can be obtained and an economical effect can be provided by significantly reducing manufacturing cost of the legged mobile robot.

It will be understood by those skilled in the art that the present disclosure can be embodied in other specific forms without changing the technical idea or essential characteristics of the present disclosure. Therefore, it should be noted that the above-described embodiments are merely embodiments selected and presented in order to help the understanding of those skilled in the art, so that the technical spirit of the present disclosure is not necessarily limited only to the presented embodiments, and various alterations, additions, modifications and other equivalent embodiments may be made without departing from the technical spirit of the present disclosure.

What is claimed is:

1. A neck device for absorbing shock and reducing vibration of a legged mobile robot, the neck device comprising:

a shock absorber fixed to a body portion of the legged mobile robot in which a plurality of leg portions support the body portion, the shock absorber being configured to absorb shock and vibration;

a sensor platform coupled to a part of the shock absorber, the sensor platform comprising a camera and an inertial measurement unit; and a variable dynamic vibration absorber mounted on the sensor platform, the variable dynamic vibration absorber being configured to adjust an absorption frequency of shock and vibration caused by a movement of the legged mobile robot,

wherein the shock absorber and the variable dynamic vibration absorber are configured to reduce shock and vibration transmitted to the sensor platform, so as to reduce movement and rotation of the sensor platform, and wherein the variable dynamic vibration absorber comprises:

an actuator coupled to the sensor platform;

a torsion spring configured to be rotated by an operation of the actuator;

a guide connected to the torsion spring and configured to be rotated; and a linear stepping motor configured to be moved along the guide.

2. The neck device of claim 1, wherein the shock absorber comprises:

a fixed plate fixed to the body portion of the legged mobile robot; and a plurality of linkages connected to a plurality of joints with a plurality of connection rods such that first side portions of the plurality of linkages are fixed to the fixed plate and second side portions of the plurality of linkages are fixed to the sensor platform.

3. The neck device of claim 2, wherein the plurality of linkages further comprise a hydraulic damper and a spring.

4. The neck device of claim 1, wherein the variable dynamic vibration absorber is configured to rotate the torsion spring so that the guide and the linear stepping motor are maintained to be horizontal as the linear stepping motor moves along the guide.

* * * * *